United States Patent

[11] 3,577,156

[72] Inventors Boris Evgenievich Paton
Ulitsa Kotsjubinskogs, 9, Kv. 21;
Vladimir Konstantinovich Lebedev, Ulitsa
Engelsa, 25, Kv. 12; Petrovich Pavel, Ulitsa
Tatarskaya 2-b Kv. 12; Mikhail Petrovich
Pashulya, Ulitsa Konstantinovskaya-61,
Kv. 11, Kiev, U.S.S.R.
[21] Appl. No. 805,656
[22] Filed Mar. 10, 1969
[45] Patented May 4, 1971
[32] Priority June 14, 1968
[33] U.S.S.R.
[31] 1250703

[54] PULSE GENERATOR
2 Claims, 3 Drawing Figs.
[52] U.S. Cl. .................................................. 219/131,
219/130, 323/34, 323/51
[51] Int. Cl. .................................................. B23k 9/10
[50] Field of Search .......................................... 219/73, 76,
108, 116, 130, 131, 131 (R), 135, 136; 323/22, 22
(SCR), 44, 48, 24, 34, 35, 36, 51; 321/18, 47

[56] References Cited
UNITED STATES PATENTS
| | | | |
|---|---|---|---|
| 3,259,832 | 7/1966 | Summerer.................... | 323/22X |
| 3,324,379 | 6/1967 | Mulder......................... | 219/131X |
| 3,398,255 | 8/1968 | Aldenhoff..................... | 219/116X |
| 3,405,345 | 10/1968 | Someda et al. ............... | 323/35X |
| 3,417,320 | 12/1968 | Maskovac .................... | 323/36X |
| 3,432,739 | 3/1969 | Kauffman...................... | 323/34X |

Primary Examiner—J. V. Truhe
Assistant Examiner—C. L. Albritton
Attorney—Holman & Stern ABSTRACT: A novel pulse generator for pulse arc welding and building up of parts by one or several arcs is disclosed, the novel generator comprising a pulse unit and a control unit. The pulse unit comprises a transformer, the number of secondary windings of which corresponds to the number of welding arcs, or the number of secondary windings is half the number of welding arcs, so as to ensure simultaneous operation of the required number of welding arcs.

INVENTORS
BORIS EVGENIEVICH PATON
VLADIMIR KONSTANTINOVICH LEBEDEV
PAVEL PETROVICH SHEIKO
MIKHAIL PETROVICH PASHULYA

By Holman, Glascock, Downing
 & Seebold
        ATTORNEYS

PULSE GENERATOR

The present invention relates to power sources and pulse generators for arc welding and may be employed in machine engineering for energy-storage arc welding and building up of metals.

This may be effected with the use of a consumable electrode by inert-gas arc welding, by submerged arc welding, or by unshielded arc welding, operating either with conventional or with multioperator welding sources.

Known in the art are devices for energy-storage arc welding and building up of parts, which operate with a welding source and comprise a pulse unit with a transformer and a control unit (see, for example, "Svarochnoe Proizvodstvo" [Welding Practice] No. Practice/No.5 Mashinostroenie, Moscow, 1966).

The known devices are disadvantageous in that they can supply current pulses only for one arc.

Besides, the known devices have large overall dimensions, great weight and their schematic diagram is quite complicated.

The object of the present invention is to provide a pulse generator for energy-storage arc welding and building up of metals, which will have smaller overall dimensions and weight, whose schematic diagram will be simplified, and which will be able to ensure simultaneous operation of several welding arcs.

In accordance with said and other objects the essence of the present invention resides in that in the pulse generator for energy-storage arc welding and building up of parts, that operates with a welding source comprising a pulse unit with a transformer and a control unit, according to the invention, the secondary windings of the transformer, whose number corresponds to the number of welding arcs, with each end thereof are connected to the anode of its own separator valve and to the cathode of its own controlled rectifier, the anodes thereof being connected in a common point which, through an inductance coil is connected with the part being welded, the cathodes of the separator valves of at least one secondary winding are also connected in a common point which is coupled to the respective electrode, and the unit adapted to control the controlled rectifiers comprises a stepdown transformer and a differential transformer whose primary winding is connected with the secondary winding of said stepdown transformer through an RC circuit, and at least one secondary winding of the differential transformer, through a diode, an adjustable resistor and a switch connected in series, is connected with the control circuit of said controlled rectifier of the pulse unit.

It is expedient, that the circuit which connects the cathodes of the separator valves of the pulse unit be made open, and each cathode of said valves be connected to the corresponding electrode, whereby the number of welding arcs will be twice as great as the number of the secondary windings of the transformer.

Other objects and advantages of the present invention will become more fully apparent upon consideration of the description of exemplary embodiments thereof, to be had in conjunction with the accompanying drawings, wherein.

Figure 1:
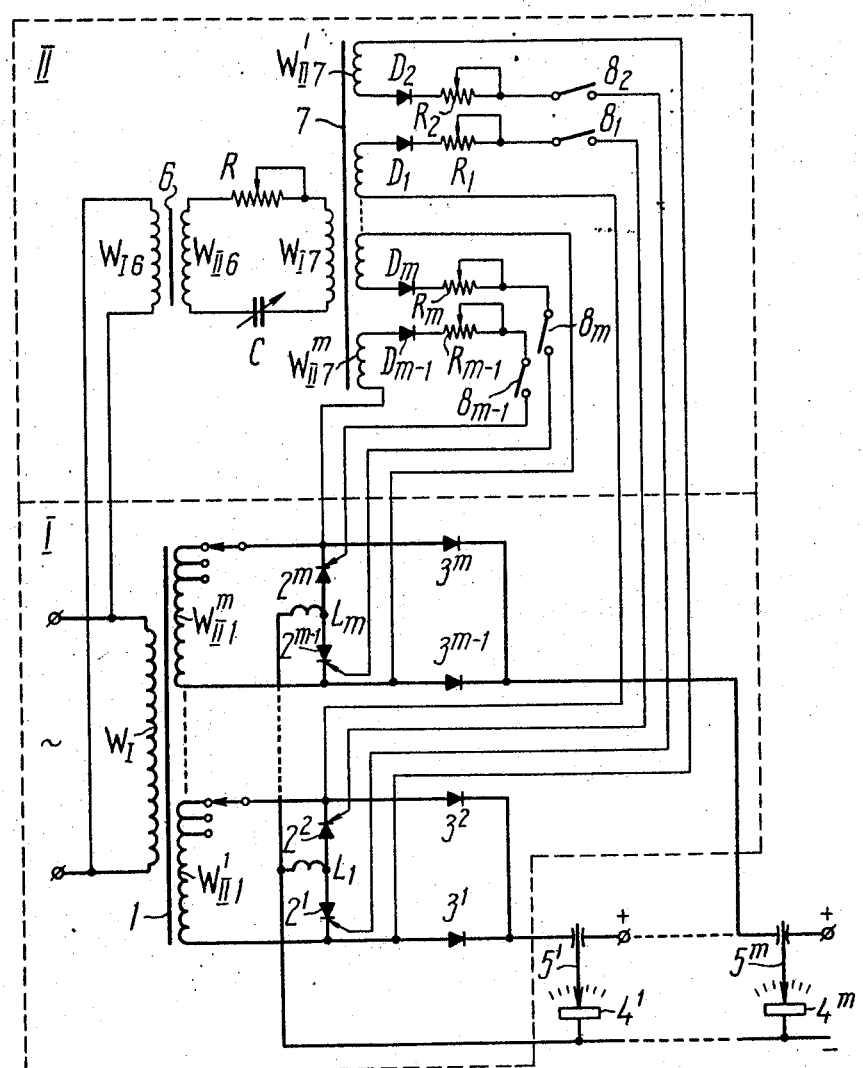
FIG. 1 is a schematic diagram of the pulse generator for energy-storage arc welding, according to the invention.

The pulse generator for energy-storage arc welding and building up with at least one arc comprises a pulse unit I (FIG. 1) and a unit II to control the generator operation. The pulse unit I comprises a power transformer 1 with one primary winding $W_I$ and a plurality of secondary windings $W_{III}^1...W_{III}^m$; $W_{III}^m$. The magnetic core of the transformer 1 is made with an airgap. The primary winding $W_I$ of the transformer 1 is connected to AC voltage mains. Connected in parallel to each secondary winding $W_{III}^1...W_{III}^m$ are circuits constituted by two controlled silicon rectifiers $(2^1+2^2)...(2^{m11}+2^m)$. To each cathode of the controlled rectifiers $(2^1+2^2)...(2^{m11}+2^m)$ the anode of the corresponding separator valve $3^1...3^m$ is also connected.

Figure 2:
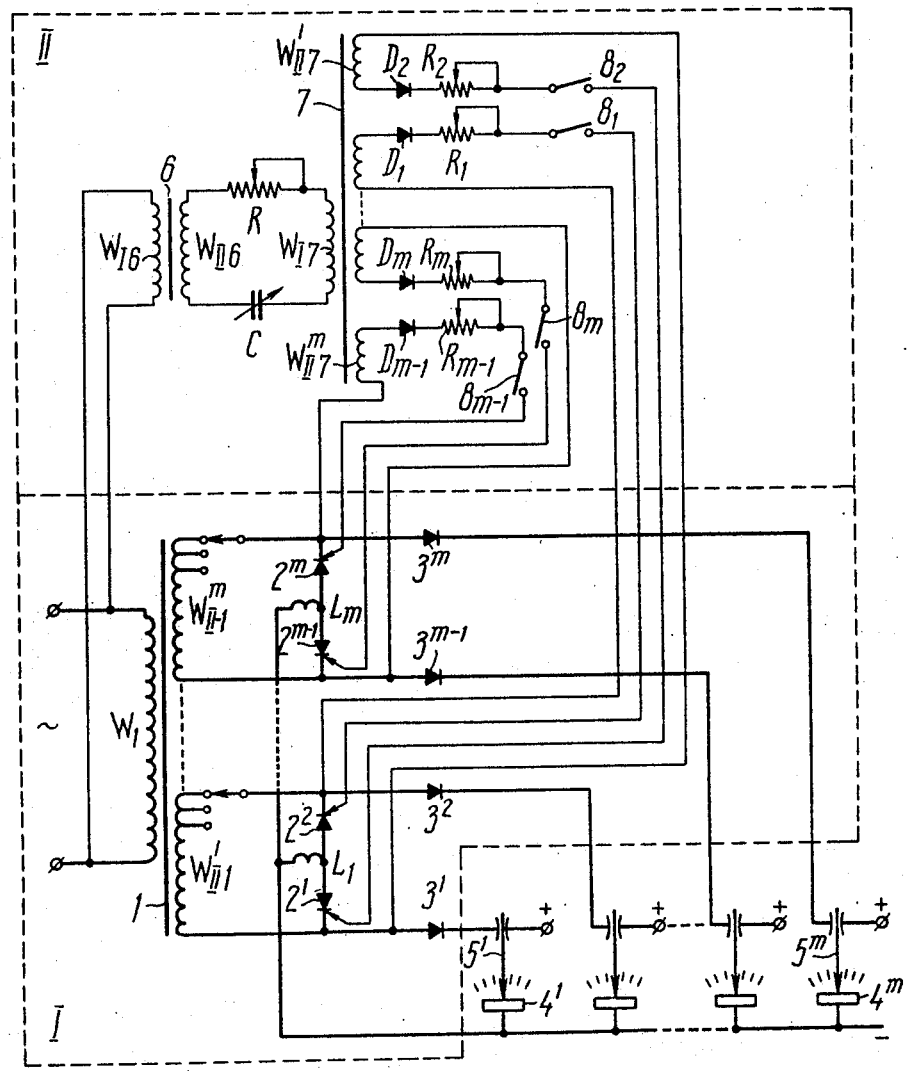
FIG. 2 shows a schematic diagram of the pulse generator for energy-storage arc welding with another embodiment of the pulse unit, according to the invention.

The anodes of each pair of said values for one winding $W_{III}^1...W_{III}^m$ are connected together in one common point, and each cathode is connected, respectively, with the beginning or the end of said secondary windings. The common points of the two anodes of each pair of the controlled rectifiers $(2^1+2^2)...(2^{m-1}+2^m)$ through inductance coils $L_1...L_m$ are connected with parts $4^1...4^m$ to be welded which are coupled to the negative terminal of the welding source (not shown in FIGS. 1 and 2).

If the arc is to be powered with current pulses at a frequency of 50 and 100 c.p.s., the cathodes of each pair of the separator valves $(3^1+3^m)...(3^{m11}+3^n)$ of each secondary winding $W_{III}^1...W_{III}^m$ are also connected in one common point. Each such point is connected to the corresponding electrode $5^1...5^m$ that is coupled to the positive terminals (or terminal) of the welding sources (or source). The number of the electrodes is equal to the number of the secondary windings $W_{III}^1...W_{III}^m$. If the arcs are to be powered with current pulses at a frequency of 50 c.p.s., the cathodes should not be connected in a common point (FIG. 2), but instead each separately is to be coupled to the respective electrode $5^1...5^m$, the number thereof in this case being twice as great as that of the secondary windings $W_{III}^1...W_{III}^m$. This is a second embodiment of the pulse generator according to the present invention. As pointed out hereinabove, in this case one secondary winding of the transformer 1 supplies current pulses to the welding arcs.

The operation of the pulse unit I is controlled by the control unit II which comprises a stepdown transformer 6, an RC circuit and a differential transformer 7. The primary winding $W_{16}$ of the stepdown transformer 6 is connected in parallel to the primary winding $W_I$ of the power transformer 1. Inserted in series into the secondary winding $W_{II6}$ of the stepdown transformer 6 are an adjustable capacitor C, the primary winding $W_{17}$ of the differential transformer 7 and an adjustable resistor R. The windings of the differential transformer 7 are wound on a magnetic core that has a rectangular hysteresis loop. The number of the secondary windings of the differential transformer 7 is equal to that of the controlled rectifiers $(2^1+2^2)...(2^{m-1}-2^m)$. Connected in series with one of the ends of each secondary winding $W_{II7}^1...W_{II7}^m$ are diodes $D_1...D_m$ adjustable resistors $R_1...R_m$ and switches $8_1...8_m$.

The output of each switch $8_1...8_m$ is connected with the control electrode of the corresponding controlled rectifier $2^1...2^m$. The second end of each secondary winding of the differential transformer 7 is connected with the cathode of the corresponding controlled rectifier $2^1...2^m$.

In case, due to some technological reasons, the arc is to be supplied with current pulses at a frequency of 50 c.p.s., the cathodes of the separator valves $3^1+3^m$ (FIG. 2) should not be connected in a common point, but each of them should by connected with the corresponding welding arc.

The device operates as follows.

The arcs strike when powered from welding sources. When the arcs are to be supplied with current pulses at a frequency of 50 and 100 c.p.s., the device should be embodied, as pointed out hereinabove, according to the schematic diagram shown in FIG. 1.

We shall consider the operation of the pulse generator for the case when pulses are shaped for one arc. The operation of the generator for $n$ arcs is analogous.

Figure 3:
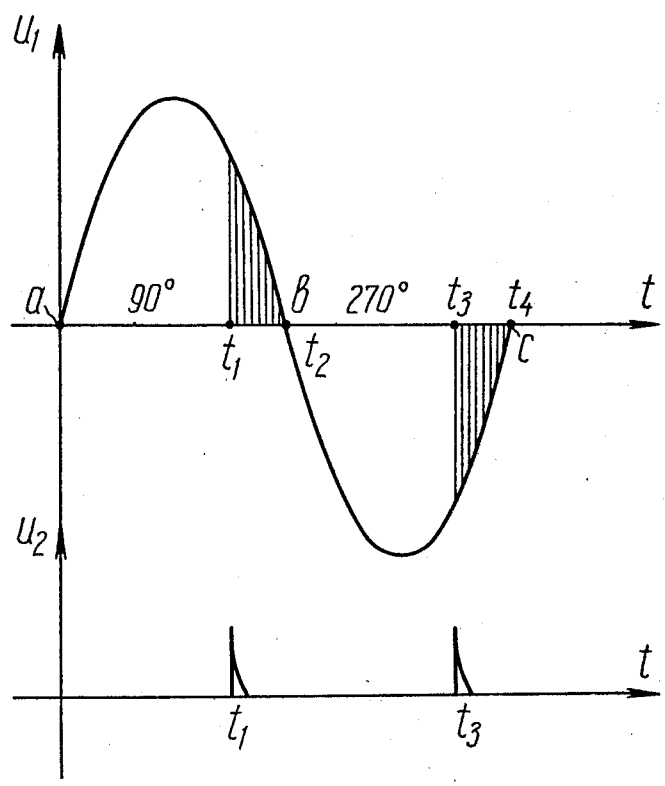
FIG. 3 shows time diagrams of shaping current pulses, according to the invention.

Current pulses are produced due to the phase control of the operation of the controlled silicon rectifiers $(2^1-2^2)...(2^{m1}-2^m)$ during each half period of voltage $U_1$ (FIG. 3) of the secondary windings $W_{III}^1...W_{III}^m$ of the transformer 1 and due to the connection of the arcs according to the circuit diagrams proposed herein.

During the positive half wave $(ab)$ of the sinusoidal voltage $U_1$ at the beginning of the winding $W_{III}^1$ (FIG. 1) the positive voltage $U_1$ of the sinusoid half wave is impressed to the circuit: the separator valve $3^1$—arc—inductance coil $L_1$—controlled rectifier $2^2$.

At one of the moments of time of the half wave $t_1$ (FIG. 3) a positive control signal $U_2$ arrives to the control electrode of the controlled rectifier $2^2$ from the control unit II. The controlled rectifier $2^2$(FIG. 1) opens, and at the moment $t_1$ (FIG. 3) a powerful current pulse is imposed onto the arc as a segment of the sinusoid (this being, as a rule, within the segment after 90°, 270°) along the circuit: the beginning of the winding $W_{III}^1$ — separator value $3^1$ — arc — inductance coil $L_1$ — controlled rectifier $2^2$ — the end of the winding $W_{III}^1$.

During the subsequent half period of the sinusoidal voltage $U_1$ at the winding $W_{III}^1$ the voltage half wave ($bc$) is impressed from the end of the winding $W_{III}^1$ through the separator valve $3^1$ and the arc to the second controlled rectifier $2^1$. The controlled rectifier $2^1$ is opened by the control signal $U_2$ whose time of appearance $t_3$ within the half wave ($bc$) of the sinusoid is adjusted by the control unit II, and a second powerful current pulse is imposed onto the arc through the circuit: the end of the winding $W_{III}^1$ — separator valve $3^2$ — arc — inductance coil $L_1$ — controlled rectifier $2^1$ — the beginning of the winding $W_{III}^1$. At the same moments of time current pulses are imposed onto all the remaining arcs in a similar manner. Then the cycle is repeated.

The duration and amplitude of current pulses fed to the arc are adjusted by the control unit II by varying the moment of time $t_1$ when the control signal $U_2$ is to arrive to the control electrodes of the controlled rectifiers $2^1...2^m$. The voltage at the secondary winding $W_{II6}$ of the stepdown transformer 6 coincides in phase with the voltage at the secondary windings $W_{III}^1...W_{III}^m$ of the transformer 1.

The impedance of the circuit: resistor R — primary winding of the differential transformer 7 — capacitor C is of a capacity reactance character. The current in said circuit and, hence, the voltage at the primary winding $W_{I7}$ of the differential transformer 7 leads with respect to the voltage at the secondary winding $W_{III}^1$ of the transformer 1 by a certain angle $\Phi$. At the moments of time when the current characteristic curve passes through zero, at the secondary windings $W_{II7}...W_{II7}$ of the differential transformer 7 there appear voltage pulses $U_2$ (FIG. 1), time-shifted with respect to the sinusoid $U_1$ of voltage at the secondary windings $W_{III}^1...W_{III}^m$.

Control pulses U2 through the diodes $D_1...D_n$, adjustable resistors $R_1...R_n$ said switches $8_1...8_m$ are fed to the control electrodes of those controlled rectifiers to which at the time the positive half wave of voltage $U_1$ is impressed. These control pulses $U_2$ are shifted during the positive half periods ($ab$) of the voltage $U_2$ at the controlled rectifiers $2^1...2^m$ by varying the values of C and R. Thereby the duration and amplitude of powerful current pulses imposed on the arcs are adjusted. The amplitude of said pulses is also adjusted by varying the sinusoidal voltage $U_1$ of the secondary windings $W_{III}^1...W_{III}^m$. For this purpose said elements are made adjustable. Pulses are sent to the arcs with the help of switches $8_1...8_m$. These switches serve to feed powerful current pulses to one arc or to $n$ arcs as required. The inductance coils $L_{1...m}$ serve to limit the leading edge of the powerful current pulses during their step-up.

When the arc is powered by current pulses at a frequency of 50 c.p.s. the operation of the device is similar to that described hereinabove, with the exception, that the current pulse imposed onto the arc and obtained from the positive half wave ($ab$) passes at the moment of time $t_1$ along the circuit specified above through one arc, and the current pulse obtained from the negative half wave ($bc$), through another arc. The number of welding arcs with such an embodiment of the pulse generator is twice as great as the number of the secondary windings $W_{III}^1...W_{III}^m$ of the power transformer 1.

The power generator of the present invention in accordance with either of the embodiments thereof can be adapted to operator both with one arc and with several arcs. In the course of operation with a plurality of arcs any arbitrary number thereof may be disconnected or cut in without disturbing the operation of the remaining functioning arcs.

The pulse generator of the invention is advantageous in that it makes it possible to effect multiarc welding and building up operations, or concurrent feeding of current pulses to a plurality of functioning arcs irrespective of their attitude, this resulting in a considerable increase in the efficiency of welding and building up jobs.

Heretofore all the cases considered above required the use of a corresponding number of pulse generators, a separate generator for each arc, since no generators for a plurality of arcs were known in the prior art. This fact proved to be extremely disadvantageous from the economical standpoint, and, besides, the use of a number of pulse generators was not always feasible due to the lack of the required number of the latter. Moreover, this involved higher cost of the equipment, great floor areas occupied thereby and considerable weight thereof.

The pulse generator according to the invention makes it possible to effect multiarc energy-storage welding and building up of such parts as crankshafts, for example, multipass welding with the help of several arcs arranged in succession of, say, fixed pipe joints in any attitude thereof.

The pulse generator of the present invention ensures a considerable reduction of the cost of the equipment, of its overall dimensions, of the floor space required, the efficiency of the building up and welding jobs being substantially improved.

Though the present invention has been described in connection with preferred embodiments thereof, it is evident, that various changes and modifications may be made without departing from the spirit and scope of the invention, as those skilled in the art will easily understand.

All such changes, modifications and alterations are to be considered as falling within the true idea and scope of the invention as defined in the appended claims.

We claim:

1. A pulse generator for pulse arc welding and building up of parts operating in conjunction with an arc supply source and comprising a pulse unit having a transformer with a primary winding and secondary windings, the number of which secondary windings corresponds to that of the welding arcs; separator valves, each anode of each valve being connected with a corresponding end of at least one of said secondary windings and the cathodes of said separator valves of at least one of said secondary windings being connected to a common point which is connected with a corresponding electrode; inductance coils; controlled valves, each cathode of each valve being connected with a corresponding end of at least one of said secondary windings and the anodes of said controlled valves of at least one of said secondary windings being connected to a common point and through at least one of said inductance coils to the part being welded; and a control unit comprising a stepdown transformer; a differential transformer; an RC circuit; the primary winding of said differential transformer being connected with the secondary winding of said stepdown transformer through said RC circuit; a diode; an adjustable resistor and a switch, said diode, adjustable resistor and switch being connected in series and through at least one secondary winding of said differential transformer coupled to the control circuit of said controlled valve of said pulse unit.

2. A generator as claimed in claim 1, wherein each cathode of said separator valves of the pulse unit is connected to a corresponding electrode, the number of welding arcs being twice the number of said secondary windings of the transformer.

PO-1050
(5/69)

UNITED STATES PATENT OFFICE
CERTIFICATE OF CORRECTION

Patent No. 3577156            Dated May 4, 1971

Inventor(s) Boris Evgenievich Paton et al

It is certified that error appears in the above-identified patent and that said Letters Patent are hereby corrected as shown below:

On the Title Page, item [72] listing the inventors; "Petrovich Pavel" should be changed to read "Pavel Petrovich Sheiko."

Signed and sealed this 13th day of June 1972.

(SEAL)
Attest:

EDWARD M. FLETCHER, JR.            ROBERT GOTTSCHALK
Attesting Officer            Commissioner of Patents